US011793118B2

(12) United States Patent
Boyde

(10) Patent No.: US 11,793,118 B2
(45) Date of Patent: Oct. 24, 2023

(54) ILLUMINATION FOR HORTICULTURAL AND OTHER APPLICATIONS

(71) Applicant: Tom Robin Caine Boyde, London (GB)

(72) Inventor: Tom Robin Caine Boyde, London (GB)

(*) Notice: Subject to any disclaimer, the term of this patent is extended or adjusted under 35 U.S.C. 154(b) by 0 days.

(21) Appl. No.: 15/542,360

(22) PCT Filed: Dec. 21, 2015

(86) PCT No.: PCT/GB2015/054102
§ 371 (c)(1),
(2) Date: Jul. 7, 2017

(87) PCT Pub. No.: WO2016/110669
PCT Pub. Date: Jul. 14, 2016

(65) Prior Publication Data
US 2018/0288943 A1    Oct. 11, 2018

Related U.S. Application Data

(63) Continuation-in-part of application No. PCT/GB2015/000005, filed on Jan. 9, 2015.

(51) Int. Cl.
*A01G 7/00* (2006.01)
*A01G 9/14* (2006.01)
(Continued)

(52) U.S. Cl.
CPC ............ *A01G 7/00* (2013.01); *A01G 9/14* (2013.01); *A01G 9/243* (2013.01); *F21S 11/00* (2013.01);
(Continued)

(58) Field of Classification Search
CPC ... F21V 7/16; F21V 13/04; F21V 7/05; F21V 7/09; F21V 9/14; F21S 11/00;
(Continued)

(56) References Cited

U.S. PATENT DOCUMENTS 3,861,379 A * 1/1975 Anderson, Jr. ....... G01S 3/7861
126/577
7,338,178 B2 * 3/2008 Chapin .............. G02B 19/0047
359/853

FOREIGN PATENT DOCUMENTS

CA      2768264 A1    8/2012
CN    200953774 Y    10/2007
(Continued)

OTHER PUBLICATIONS

Translation of FR 2837261 A1 (Year: 2003).*
(Continued)

*Primary Examiner* — Kathleen I Alker
*Assistant Examiner* — Steven J Shur
(74) *Attorney, Agent, or Firm* — Maynard Nexsen PC; Todd Allen Serbin; J. Clinton Wimbish

(57) ABSTRACT

A convex reflective surface, such as mirror (1) or an equivalent deflector of radiation, designed to suit a FIG. 5 particular location or type of location, fixed in position and requiring no adjustment, can re-direct solar radiation (2,3) downwards onto a chosen target area throughout the calendar year or such lesser period of operation as may be chosen, benefitting the growth of plants in a greenhouse or the open air, and other human activities, at minimal expenditure including of fossil fuel.

12 Claims, 6 Drawing Sheets

(51) Int. Cl.
*F21S 11/00* (2006.01)
*F21V 7/05* (2006.01)
*F21V 7/09* (2006.01)
*F21V 13/04* (2006.01)
*A01G 9/24* (2006.01)

(52) U.S. Cl.
CPC .............. *F21S 11/002* (2013.01); *F21V 7/05* (2013.01); *F21V 7/09* (2013.01); *F21V 13/04* (2013.01); *Y02A 40/25* (2018.01); *Y02P 60/12* (2015.11)

(58) Field of Classification Search
CPC ....... F21S 11/002; A01G 7/045; A01G 9/243; A01G 15/00; A01G 22/00; A01G 25/00; A01G 7/00; A01G 9/14
USPC ..................................................... 47/58.1 LS
See application file for complete search history.

(56) References Cited

FOREIGN PATENT DOCUMENTS

| | | | |
|---|---|---|---|
| CN | 201947717 U | 8/2011 | |
| DE | 4225007 A1 | 2/1994 | |
| FR | 2837261 A1 * | 9/2003 | .............. F21S 11/00 |
| FR | 2837261 A1 | 9/2003 | |
| FR | 2843185 A1 | 2/2004 | |
| JP | 52013852 A | 2/1977 | |
| JP | S57167001 A | 10/1982 | |
| JP | H0286004 A | 3/1990 | |
| JP | 08122621 A | 5/1996 | |
| JP | 08277644 A | 10/1996 | |
| JP | H09265815 A | 10/1997 | |
| KR | 20-2009-0002508 U | 3/2009 | |
| KR | 101278696 B1 | 6/2013 | |
| KR | 101278696 B1 * | 6/2013 | .............. A01G 7/045 |
| RU | 2101918 C1 | 1/1998 | |
| WO | 0066947 A1 | 11/2000 | |
| WO | 2007005352 A2 | 1/2007 | |

OTHER PUBLICATIONS

Translation of KR 101278696 B1 (Year: 2013).*
Driveway Mirror, 26inX36in Acrylic Rectangular Convex [online]. National Safety Mirror, 2014. [retrieved on Mar. 19, 2020], Retrieved from the Internet: <URL: https://web.archive.org/web/20140423024203/http://www.nationalsafetymirror.com/driveway-mirror-26inx36in-acrylic-rectangular-convex/> (Year: 2014).*
Notification of Transmittal of the International Preliminary Report on Patentability for corresponding PCT application PCT/GB2015/054102, dated Dec. 6, 2016, 6 pages.
International Search Report and Written Opinion for corresponding PCT application PCT/GB2015/054102, dated Mar. 29, 2016, 12 pages.
"Convex Mirrors", Security & Safety, pp. 1-4, URL: <https://web.archive.org/web/20120218232635/https://www.securityandsafety.eu/convex-mirrors/>.

* cited by examiner

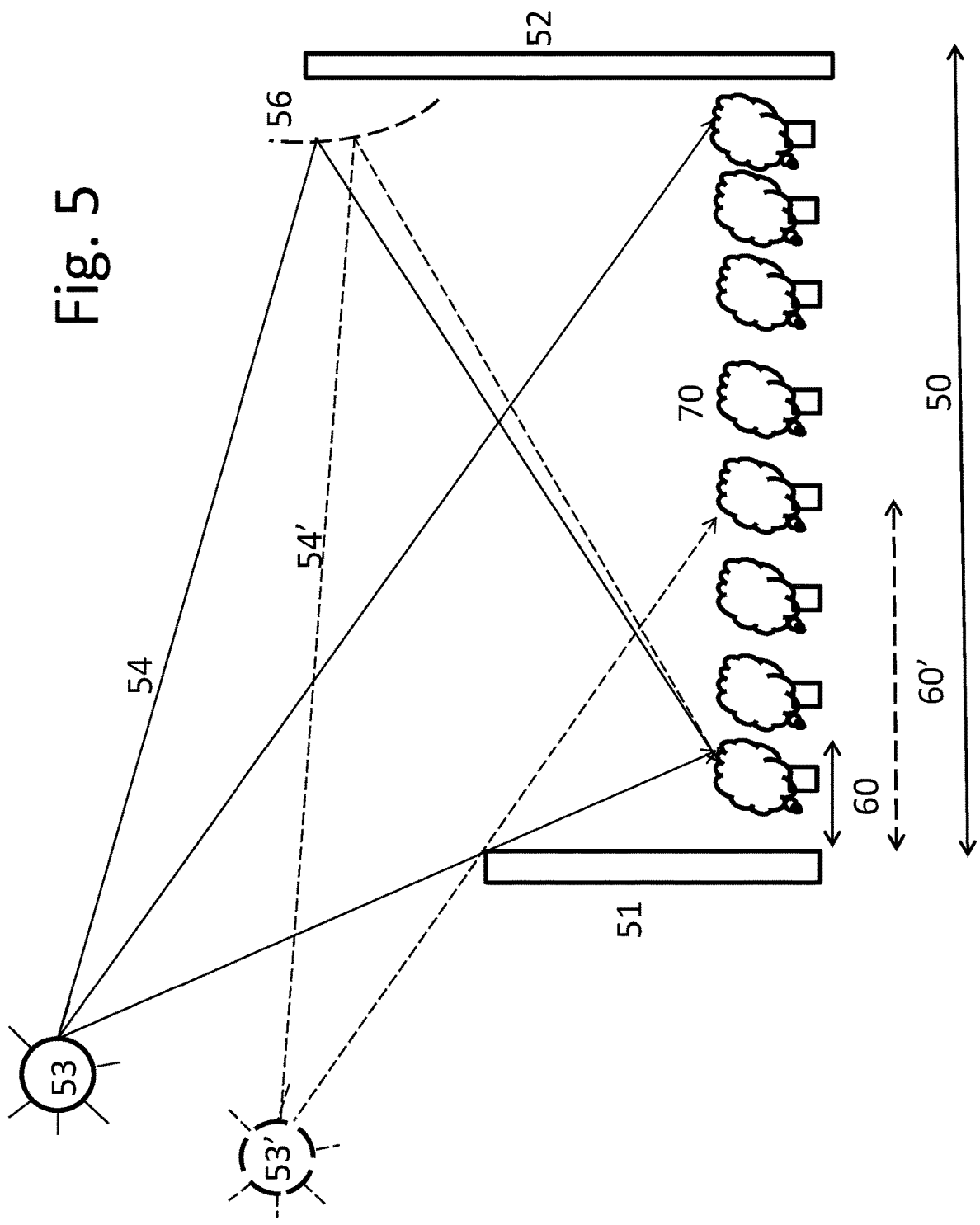

ILLUMINATION FOR HORTICULTURAL AND OTHER APPLICATIONS

CROSS REFERENCE TO PRIORITY APPLICATIONS

This application is a U.S. National Phase of PCT/GB2015/054102, filed Dec. 21, 2015, which claims the benefit of PCT/GB2015/000005, filed Jan. 9, 2015, each of which are incorporated herein by reference in their entireties.

The present invention relates to static devices for improving illumination through reflected solar radiation. The invention is primarily for improvement of plant growth and health by increasing the intensity of radiation originating from the sun that eventually reaches plants being grown in the open air or under cover, though it may serve equally to increase the intensity of solar radiation for other purposes.

The growth of green plants is dependent on receiving sufficient light of appropriate wavelengths: devices to improve plant growth by reflecting sunlight onto the plants have been the subject of patents for much more than 100 years. Other things being equal and at low light intensity, the rate of photosynthesis is nearly proportional to intensity of illumination up to a limit beyond which there is no further benefit and may be damage from local overheating (scorching), lack of water or excessive temperature. Thus the greatest benefit from increasing light intensity is to be found when both initial light intensity and temperature are relatively low. Complications arise because plant species and varieties have adapted through evolution or selection to different ranges of temperature, humidity, light intensity and duration of exposure to light, e.g. long day and short day plants, so that much of the care and labour required of a gardener is matching plant species or variety to location. However, if the light intensity is too low or illumination period too short for any particular plant, wherever it is located, improvement can be had by better illumination, and that is the prime motivation for the instant invention.

The 'greenhouse effect' is to capture radiant energy at short wavelengths and prevent escape of the energy that is unavoidably re-radiated at longer wavelengths, and by that means to increase temperature. The chief motivation for building a greenhouse is to benefit the growth of plants by raising the temperature inside. In addition there is protection against wind and ability to control all aspects of the plant environment much more closely than is possible in the open air. Increase of light intensity for photosynthesis is not the prime mover and much technical literature is concerned with shading or ventilating the greenhouse or disposing of excess heat to prevent temperature build-up arising from excessive illumination from the sun. On the other hand there remains the need for sufficient light to support plant growth.

Commercial greenhouse practice makes much use of artificial lighting carefully and expensively devised to produce the exact desired outcome and in relatively few cases is attention paid to increasing sunlight illumination. There may be commercial benefit from increasing such illumination provided that it can be done inexpensively at times when light intensity is an important factor limiting plant growth, though depending upon exactly what plants are to be grown and therefore also on the market for the final product.

Means to better illuminate either growing plants or indoor or outdoor spaces by deflecting light from the sun have been the subject of great inventive activity for centuries past In a history of greenhouse development ('The Glasshouse', Phaidon Press, London 1996, p. 58) Hix describes a forcing frame of 1737 from the Netherlands, wherein the sloping upper glass panels could be raised to both ventilate the interior and reflect some additional light downwards to the plants.

A considerable number of documents describe the use of reflecting surfaces within a greenhouse to improve the distribution of light to growing plants.

Arrangements for collecting light from outside and directing it into a greenhouse are also known.

In some of the examples just discussed, and others where the objective is not horticultural but to improve illumination within a building to support human activities, a primary collector of radiant energy is moved under control during the day so as to always face the sun and thus maximize the amount of energy collected. Such are well known under the name 'heliostat'. The solar tracking mechanism and controls of such devices must adapt for time of day and the seasons of the year: they are correspondingly troublesome, costly and complex which excludes them from comparison with the present invention.

On the priority application to the present application (PCT/GB2015/00005) the following documents were cited:

CN200953774 discloses convex mirrors, arranged internally at two sides of a greenhouse, which divert light sideways within the greenhouse. This provides more efficient light capture while sunlight is received by the greenhouse, and increases illumination of the greenhouse above that provided by directly received sunlight, but does not provide additional light at times when the greenhouse is not receiving direct sunlight WO00/66947 discloses a mirror used to reflect light sideways onto the side of a house to provide increased illumination, and comprising a sensor/motor arrangement to move the mirror to provide uniformity of illumination.

FR2837261 discloses a mirror used to reflect light sideways to provide increased illumination, mounted for movement to move the mirror to provide uniformity of illumination.

JPH0286004 discloses mirrors disposed to reflect light into a building, with automatic adjustment of the mirrors to ensure reflection into the building.

FR2843185 discloses a convex (spherical) mirror disposed to reflect light into a building.

JPH09265815 is aimed at improving lighting in a building and does not show a fixed mirror.

US2009/308377 discloses improved solar converters.

DE4225007 discloses a skylight comprising a number of light-deflecting segments which can be Fresnel lenses.

US2007/230209 discloses light transmitting elements.

None of the cited art discloses methods for increasing availability of light for photosynthesis by plants, by providing static convex reflective surfaces disposed to reflect received sunlight vertically or obliquely downwards onto plants situated in the target area at an intensity less than the received sunlight. The applicant has realised that such arrangements, in effect, extend daylight length in the target area.

The applicant has further realised that providing convex reflective surfaces that are not of constant curvature has advantage. By "constant" is meant "uniform" or unchanging with position. A sphere or part sphere has a constant curvature, many shapes have curvature that is not constant.

The instant invention springs from considering the state of plants grown outdoors in an urban environment where continuing construction of buildings around the site progressively reduced the hours of sunlight reaching those plants. The inventor realised that a mirror could be so designed and so installed that it would need no adjustment during the day or even for a whole year although providing illumination by deflected sunlight at all hours when the sun was both above the horizon and not obscured by cloud, haze, neighbouring tall buildings or other objects. It was further realised that if the deflected radiation is undesirable at certain times of day and year, it can be eliminated at the design stage or later simply by removing or obscuring the corresponding segment of a stationary mirror. Some consequences follow inevitably from these initial inventive steps; others have the nature of supplementary inventive steps.

Definitions:

Altitude is the angular height of the sun above the unobstructed horizon at that location and time.

Azimuth is the direction of the sun as projected onto the horizontal plane and is here denoted in degrees of compass bearing, not according to the astronomical convention.

Compass bearing. Geographical direction is expressed as compass bearing in degrees, such that true North is 0° or 360°, East 90°, South 180°, and so on.

'Fresnel mirror' has previously been used in the patent literature with the same meaning as in this specification, that is to say, any set of surfaces that together have the effect of a unitary mirror, whether plane, concave or convex. Originally 'Fresnel' was applied only to lenses of the type introduced by Augustin-Jean Fresnel for use in lighthouses and the meaning is extended by analogy.

Greenhouse means any arrangement for growing plants under a canopy or in an enclosure that is wholly or partly transparent to light, whether or not additional arrangements are made for heating or illumination.

Horticulture means any methods and objectives of growing plants otherwise than by leaving the outcome wholly to nature, and includes gardening, growing plants in pots, window boxes or any container, with or without soil, indoors or out, inside or outside a greenhouse. 'Agriculture' can be used instead if the scale or nature of the operation is such as to preclude use of the present invention.

Inclination means the angle of the reflecting surface of a mirror above horizontal, at a particular point and whether the surface is curved or not, expressed in degrees.

Intensity of radiation is as measured by any methods and expressed in any units known in the art, but always as if falling on a surface normal (at 90°) to the direction of travel of the radiation being measured. Low intensity means such a level of intensity of radiation that any increase yields an increase in rate of photosynthesis of any plants that might be placed in the target area; provided that the wavelengths are appropriate for photosynthesis; or if not, then calculated as if the wavelengths were appropriate.

Light is composed of radiant energy of those wavelengths that can be appreciated by the human eye. Radiant energy is the preferred term for most purposes in this specification and may be substituted for the word 'light' wherever the context does not require limitation to visible wavelengths. Illumination and radiation refer to radiant energy of any wavelengths.

Mirror, unless otherwise qualified or obvious from the context, means a mirror of the instant invention including an assembly of mirrors, or a component mirror of such an assembly. Component mirror means a reflecting surface or portion of such a surface that when combined with others makes up a mirror of the present invention.

Target means that area intended to be illuminated by a device of the instant invention, and 'area' if unqualified has the same connotation. 'Spot' means a small zone within a target or other area.

Tripod means a system of three adjustable struts that may be used to connect a device of the instant invention to an above-ground construction of whatever kind or to the ground itself.

In the following non-limitative disclosure reference is made to the Drawings (Figures) in which:

FIG. 5 illustrates schematically operation of the present invention in a particular location;

Figure 1:
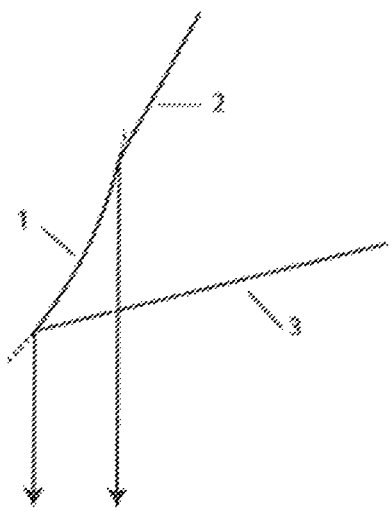
FIG. 1 illustrates schematically reflection from a curved surface.

Whenever the sun is shining, unless it is directly overhead, a plane mirror can be arranged with such an orientation and inclination that radiation from the sun is reflected vertically downwards with moderate loss of intensity, but it is obvious that, to maintain illumination of a target from this source throughout the day, the plane mirror will have to be moved continually in respect of both compass bearing and inclination, obvious also that the settings perfect for one day will not be perfect for the next, because the altitude of the sun at any given hour of the day or azimuth changes day by day in sequence through the seasons. By the same token a given altitude occurs at azimuth values and hours of day that change day by day in sequence through the seasons. Note however that these changes of compass bearing and altitude occur in a wholly predictable manner. It is therefore possible to devise and fix a convex mirror facing a given compass bearing that will always, when the sun reaches that azimuth during its daily progression, reflect some of the light from the sun vertically downwards on every day of the year that the sun is above the horizon at the azimuth concerned and provided that there is a clear sky and no shadow. FIG. 1 illustrates this principle in the simplest possible way showing that for a latitude of 52°, at both the summer solstice (altitude 61.5°) and the winter solstice (altitude 14.5°) and at all dates in between, some of the incident radiation is reflected directly downwards.

It will be clear that a little leeway must be allowed, but in principle mirror inclinations above 75.8° and below 52.3° are not useful at this location and compass bearing. The mirror section is shown as being the segment of a circle (which is not an obligatory restriction) and such a mirror would be basically cylindrical with a horizontal axis, but not a complete cylinder. Quite a small portion of the circumference of a cylinder is enough because the altitude at a given azimuth varies during the year over a maximum range of ±23.5°, total 47°.

Here and throughout the Description, azimuth, altitude, mirror inclinations and vertical and horizontal dimensions of mirrors at Northern latitudes were calculated by means of a computer APP designed for the purpose, available on request, to be extended later to the Southern hemisphere and for deflection of radiation other than directly downwards.

Figure 2:
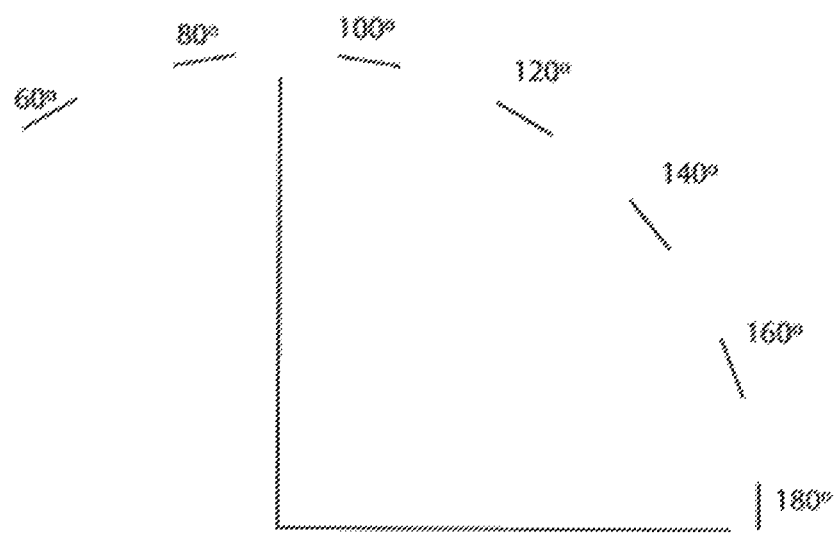
FIG. 2 illustrates schematically a series of mirrors on differing azimuths.

A series of mirrors like that of FIG. 1, similar to each other but shaped appropriately for the relevant range of altitudes, placed so that each faces the next compass bearing in sequence, is an embodiment of the present invention and will reflect light downwards towards a pre-determined target area throughout the sunlit portion of each day of the year, though not continuously to any particular chosen spot within the target area because of the gaps between and discrete compass bearings of the separate mirrors. To avoid shadowing each other, the mirrors must be placed in a curve. FIG. 2 shows only the top edges of a series of mirrors, each labelled with the compass bearing that it faces, intervals 20°. This particular arrangement can provide downwards radiation throughout the morning at mid-summer at around 50° N, if there are no obstructions, and for a lesser period of time during the winter months.

Figure 3:
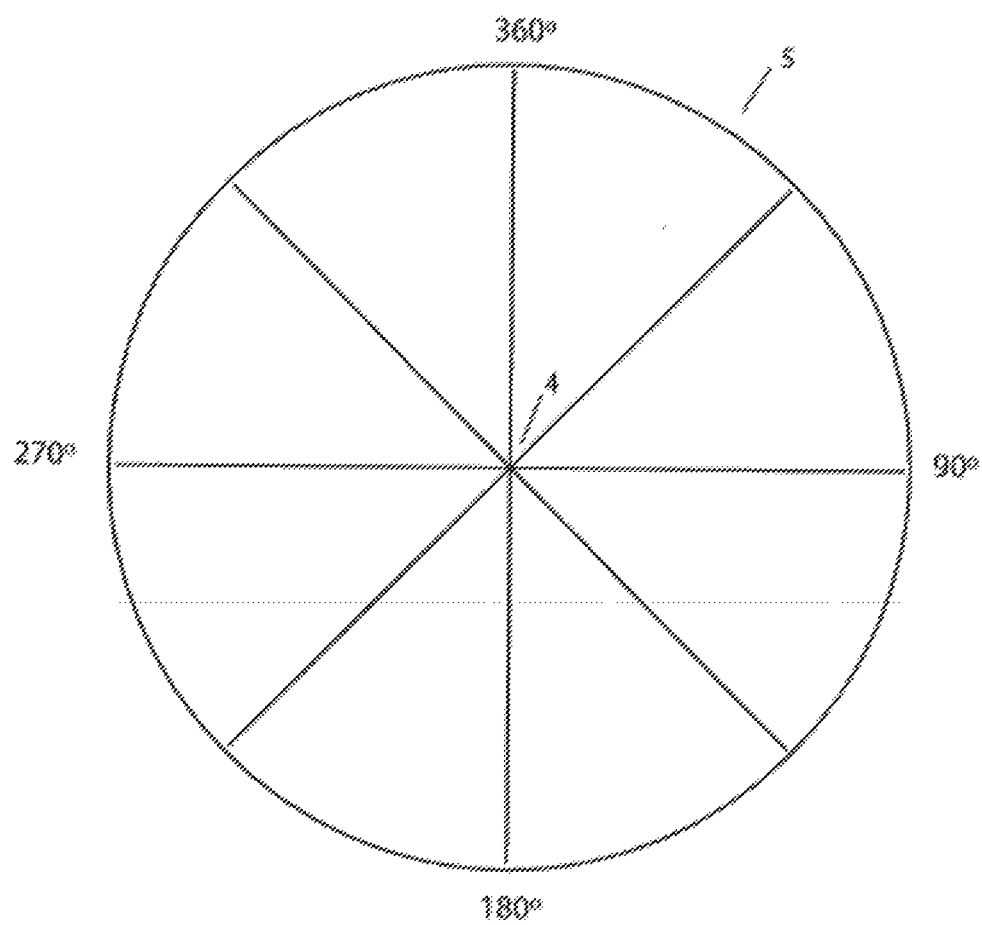
FIG. 3 illustrates schematically a reflecting curved surface from above.

Preferably these separate reflecting surfaces are replaced by a single mirror of appropriate curvatures that vary continuously in the horizontal plane as well as vertically. North of the Arctic Circle (or South of the Antarctic) a mirror of this invention can provide downwards radiation continuously for 24 hours during a brief period in summer (FIG. 3).

Figure 4A:
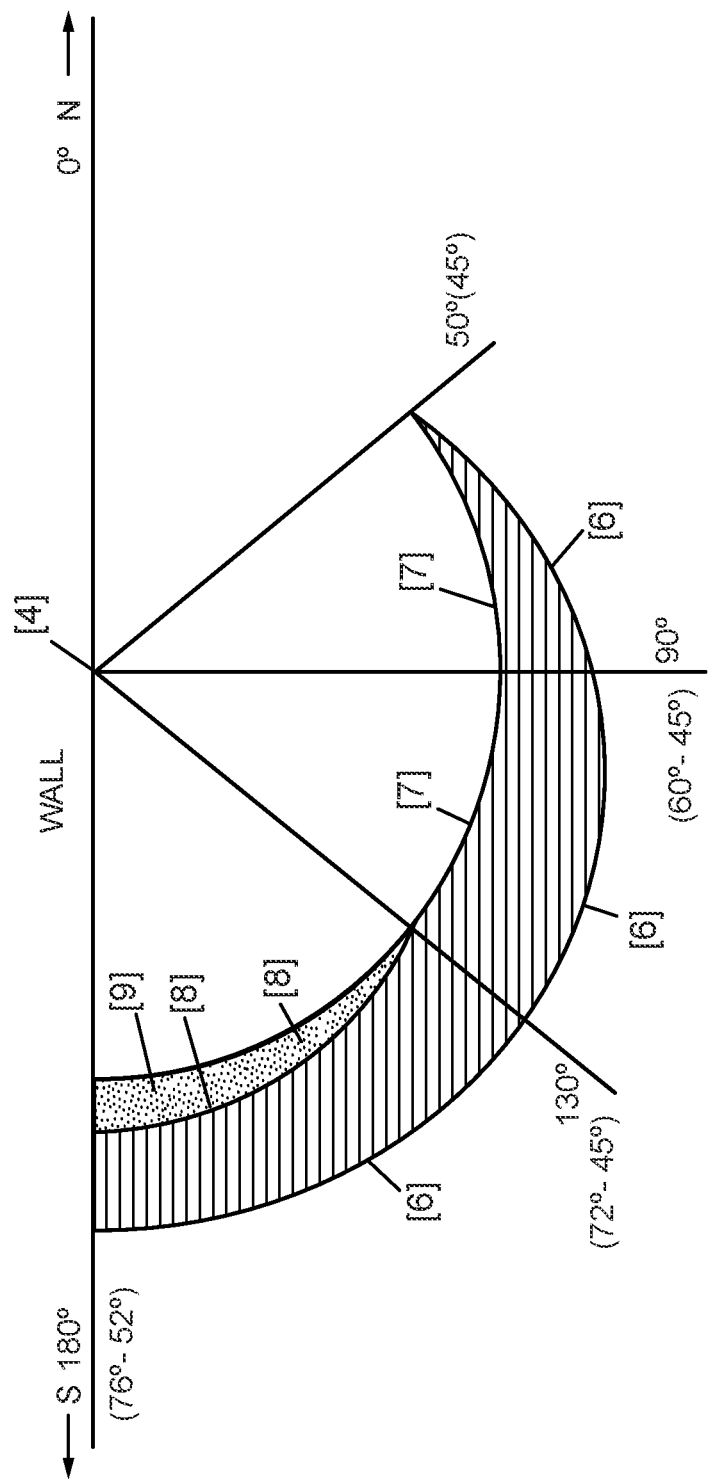
FIGS. 4A and 4B illustrate schematically a mirror of constant curvature.
Figure 4B:
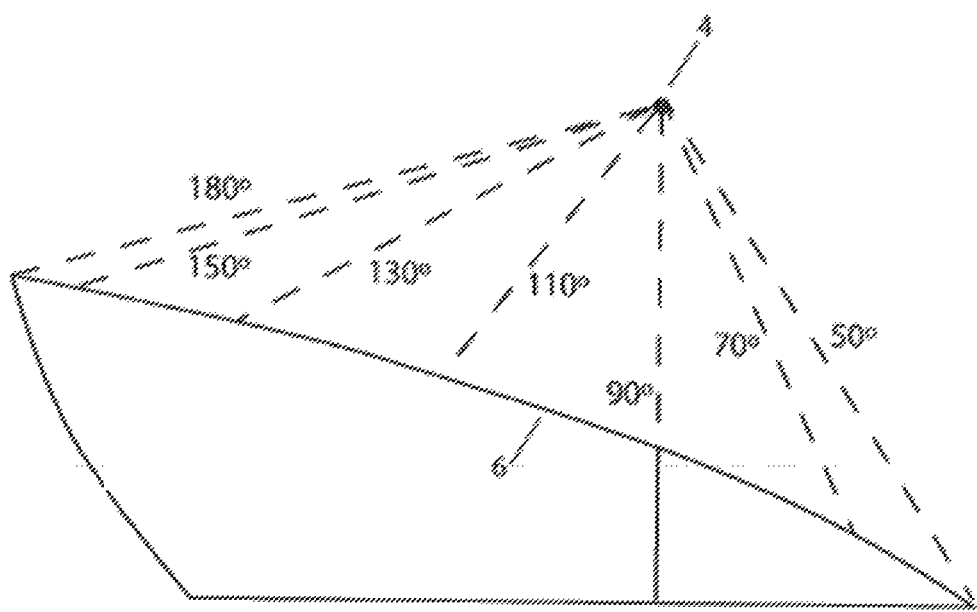

FIGS. 4A and 4B are two diagrammatic views of the same mirror from above and from the East respectively, though the scale is different. The embodiment is secured to an East-facing wall to at 52° latitude to deflect radiation downwards to a target area at the foot of the wall but only during the morning hours as the mirror itself is in shade during the afternoon. It will be obvious to one skilled in the art that no change of principle is involved when attaching a mirror of the invention to any object whatever and that any arc of compass bearings may be used.

Figure 6:
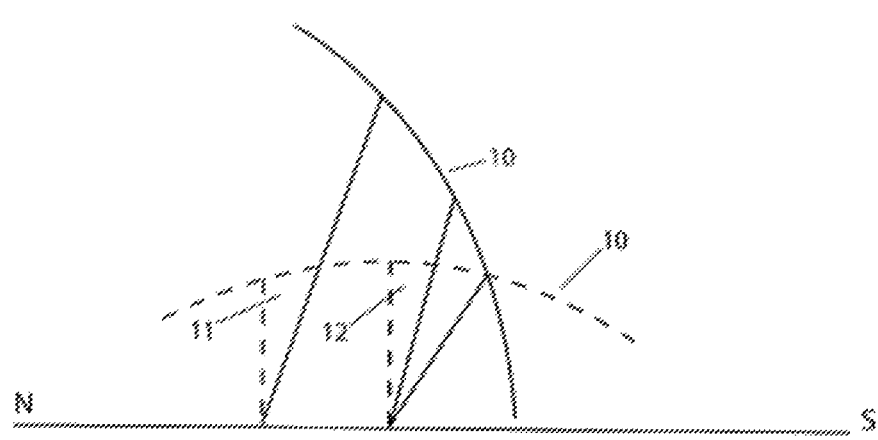
FIG. 6 illustrates schematically an adjustable mirror for use in the present invention.

Additional Aspects of the Invention:

Certain aspects of the invention follow upon the key inventive steps either inevitably or incorporating supplementary inventive steps.

a] One consequence of using a convex mirror is that the deflected radiation is of less intensity than that incident upon the mirror. This is regarded as an advantage in the most common uses of the present invention, namely to provide additional radiant energy in circumstances where the intensity in its absence is limiting to the extent that any increase is beneficial.

b] The surface of a mirror of the invention is made sufficiently rough to scatter the deflected radiant energy so that spots of excessive illumination do not occur at the target area. This property contributes to the diminution of intensity of radiant energy falling upon the target, though on the other hand some radiation is 'scattered back in' as discussed in [i] below.

c] As is clear from the embodiments already discussed, it is not a requirement that every conceivable mirror inclination be provided at all compass bearings. Those parts of a mirror that cannot possibly be of use may be omitted in manufacture, saving expense, cut out at a later stage, obscured by screens or made non-reflecting by appropriate surface treatment. This principle of customizing the shape of a mirror may also be extended for any location by omitting, obscuring or removing any segment that would yield deflected radiation that is unnecessary or harmful. It is a desirable feature in some embodiments of the present invention that a mirror is made of material that can be easily cut and modified.

d] A curved surface may be subject to powerful aerodynamic forces such as lift. For this reason and to minimize loading by snow or rainwater it may be desirable in some embodiments to provide gaps in the mirror. Such gaps would add to the surface roughness effect mentioned in [b].

e] Radiation is deflected downwards but not necessarily vertically downwards and there are locations where it is definitely advantageous to provide for an obliquely downward path, for example to avoid opaque obstructing objects or undesired shadowing by the device itself. In such a case the preferred shape, curvatures and overall orientation of the mirror differ from those of a mirror deflecting vertically downward, though it may often be sufficient to use a standard form of mirror and adjust only its orientation.

f] It may be advantageous in certain locations to provide that the device itself serves as a shade at certain times of the day and year in addition to its prime function as an illuminator at other times. This may apply in horticultural applications but also in others and one example that may be of great importance is in swimming pools with a glass roof, requiring heating and extra illumination at some periods, or to be shaded at other times to avoid excessive heating.

g] Installation includes orienting the mirror so that it provides optimally for the purpose of the installation at the particular location. The architectural structure to which a mirror is attached may be of many different forms and it is not possible to provide at the time of manufacture for an exact match to all possible forms. Therefore unless there is precise foreknowledge of how a mirror will be installed it is desirable that the mirror is provided with a readily adjustable mounting and a desirable form of such mounting is a tripod in which each arm can be extended or retracted and then locked at its new length and in which each end of each arm is provided with a universal joint such as a ball and socket joint which in turn is attached to the mirror (or a frame attached to the mirror itself) at one end and the architectural supporting structure at the other. Such means of mounting are well known in the art and allow adjustment to the desired orientation in all three orthogonal planes, within limits imposed by the practically-possible lengths of the arms of the tripod and neighbouring obstacles. Use of the word 'tripod' implies nothing about overall orientation of this ancillary supporting device. In many installations the arms are nearer horizontal than vertical and this is why the word 'arm' is used instead of 'leg'.

h] Although in the desired embodiments described so far the mirror is fixed in position, it is advantageous to provide for the mirror to be adjustable and demountable, e.g. for cleaning which will be desirable from time to time, perhaps annually, or to change the orientation of the mirror. A mirror of the present invention need not be moved or adjusted during its periods of operation. Nevertheless it is desirable in some installations to provide for occasional adjustment in case of a change in local conditions or following the seasons, allowing in some locations the use of a smaller and therefore less costly mirror. In a commercial operation, adjustment occasions a labour cost so there may be a 'trade-off' between a smaller mirror that requires occasional adjustment and a larger, more expensive, permanently fixed mirror. The embodiment of FIG. 6 is adjusted twice each year, at or near the spring and autumnal equinoxes.

i] The mirror is convex and incorporates a curved surface of varying inclination which at any moment deflects part of the incident radiation downwards to the target But at a given azimuth much of the curved surface deflects radiation to neighbouring areas that are not part of the target. In such cases it is desirable to consider whether such 'stray' deflected radiation is harmful or a nuisance, and if so it may be diverted or blocked by ancillary mirrors or screens without affecting the usefulness of the present invention.

Figure 7:
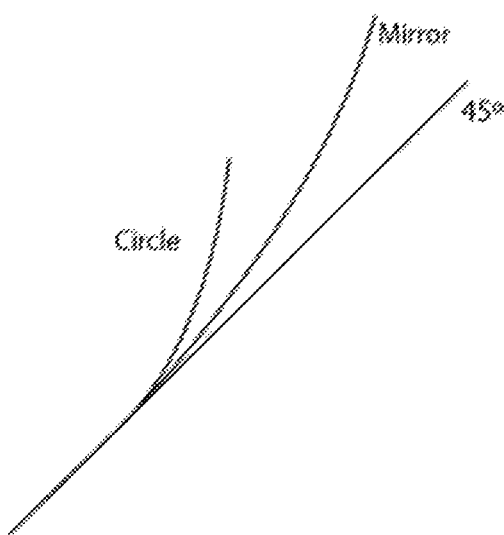
FIG. 7 illustrates schematically a mirror of non-uniform curvature.

Surface roughness will 'scatter back in' towards the desired target some radiation that would otherwise be deflected elsewhere.

j] The intensity of deflected radiation reaching the target is less in the case of a convex mirror than it would be using a exactly-oriented plane mirror of the same surface area, and in the present invention often much less though that depends on how much surface area of the mirror is deflecting radiation in the desired direction at the moment in time being considered; a small highly curved mirror producing lower intensity that a larger more gently curving mirror. The size and curvature of a mirror can be adapted at the time of manufacture to suit the requirements at a particular installation. For example, if illumination is only required for one hour at sunrise and only on certain days of the year, this is provided more effectively by a large mirror with a restricted range of convex curvature facing the restricted range of azimuths. Further, the curvature intended to serve at certain desirable hours and days may be 'stretched' so as to provide deflected radiation of greater intensity (on a per unit area basis, as defined). These features are likely to be important for certain commercial horticulture operations. FIG. 7 shows the section in the azimuthal plane of such a mirror, not of constant radius of curvature, i.e, not the segment of a circle.

k] Remarks elsewhere notwithstanding, the mechanical basis of the structure of a mirror is not limited in any way and includes a plurality of components attached to a frame, a membrane stretched over a frame, and a membrane whose shape is maintained by gas pressure either internally confined in the manner of a balloon or maintained by a stream of gas directed against the membrane. In some embodiments, the component mirrors may be flat or even slightly concave without detracting from the principle of the present invention that the mirror as a whole is convex. In some embodiments, the mirror is preferably dismounted during stormy weather, although not otherwise needing any adjustment or attention.

l] There are many other optical devices that are capable of deflecting and dispersing radiant energy in the same manner as a mirror of the present invention and the use of such other optical devices instead of a mirror is included within the scope of the instant invention, although a mirror may have advantages in cost, and simplicity of manufacture, installation and maintenance.

A mirror of the instant invention throws more light into darker places, outdoor places rather than indoors though including areas where plants are grown under protected, 'greenhouse'-type conditions. It is not intended to match the intensity of full sunlight, or to provide heating (though there may be a contribution) or collect solar energy for generation of electricity, but instead to add some additional radiant energy to areas where improvement can be obtained thereby. It achieves this in an inexpensive and simple manner, with no moving parts or control mechanism, zero or minimal adjustment (none at all during the working day) and minimal maintenance. The invention is as much, or more, concerned with extending duration of illumination as intensity of illumination.

One particular application is in gardening in small permanently or excessively shaded urban areas where a device of the instant invention mounted on a wall or otherwise high above the target provides radiant energy, for several hours per day, of perhaps several times the intensity that would otherwise reach the target, though still less than direct sunlight.

Another particular application is in providing additional radiation to a greenhouse in a high latitude at times when the sun's altitude is low—for example for a short time each day, even only for one or two hours just after sunrise when the heating effect of additional radiation is also beneficial and saves the cost of fuel or electric power. Such a mirror may be mounted so as to allow rotation from time to time to face each desired direction in a manner resembling that shown in FIG. 6. Typically it is set to one side of the greenhouse so as not to shade the greenhouse at other times of day and its curvatures and inclinations are adapted to allow for that.

Further applications will be obvious to one skilled in the art and include the provision at low cost of pleasant conditions for outdoor work or leisure activities.

Included in the claimed invention are: uses in applications, indoors or outdoors, other than horticultural; use of additional features or devices that add to the effectiveness of the invention without change of principle and operate in association with the claimed invention, for example by further deflecting radiation that has been already deflected by a device of the invention; a device not being a mirror that produces deflection of radiation in a manner sufficiently like a convex mirror that it can be substituted for a mirror in the claimed invention; a device that selects or modifies the wavelengths of radiation impinging upon it so that in addition to deflection of radiation as claimed the wavelengths of the deflected radiation reaching the target have been changed from those impinging on the device; means of manufacture of the claimed device, without limitation as to materials; means of installation, adjustment and fixing to supporting structures including specifically the use of a 'tripod' support.

FIG. 1 shows a vertical section of a convex mirror [1] facing 180° in latitude 52° N. Light from the sun at noon local solar time, at the summer solstice, has the altitude 61.5° [2] and is reflected directly downwards by the portion of the mirror surface inclined at 75.8°. Similarly at the winter solstice, light from the sun at noon local solar time (altitude 14.5°) [3] is reflected directly downwards by the portion of the mirror surface inclined at 52.3°. As illustrated here the mirror section is the segment of a circle.

FIG. 2 shows the top edges only of an array of mirrors, each resembling that of FIG. 1 except for the maximum and minimum mirror inclinations to be used which are specific to each, set in a curve so as to avoid shadowing each other, each facing the indicated compass bearing, intervals 20°, approximately 50° N latitude where the azimuth at midsummer dawn is near 50°.

FIG. 3 is a 'maximum circumferential mirror' at 70° N latitude, viewed from above. Radiating from the centre [4] to the circumference of the mirror [5] are lines at the indicated compass bearings: the maximum and minimum usable mirror inclinations being as follows: (360°) 45°-47°, (90°, 270°) 45°-57.6° (180°) 45°-67°. The circumference of the mirror is equidistant in a horizontal plane from the centre. In this example, the mirror is not of constant radius. Using the nomenclature applicable in FIGS. 4A and 4B, FIG. 3 is drawn with constant H, and the radius of curvature of the mirror is not constant, but varies with compass direction.

Such a mirror can be suspended from a single central mast or tower, and advantageously is stabilized by stays attached around the circumference.

In the example of FIGS. 4A and 4B, latitude is 52° N, the mirror, fixed to an East-facing wall, is shaped as a slice of a hollow sphere from mirror inclination 45° up to the maximum mirror inclination at each azimuth and the unit of length for H or V referred to below is the radius of curvature of the sphere. In FIG. 4A, the mirror is viewed from above so we see the back, non-reflecting, surface. Azimuth lines radiate from the centre of the sphere [4], which is on the wall above the mirror. They are labelled with compass bearing in degrees and also (in brackets) the maximum and minimum useful mirror inclinations along that azimuth for that latitude. The upper edge [6] of the mirror is at the horizontal distance ($H_{max}$) from the centre to where the maximum usable mirror inclination is found (at midsummer). The lower edge of the mirror [7] and [8] is at the horizontal distance ($H_{min}$) from the centre to where the minimum usable mirror inclination occurs (at midwinter). This minimum useful mirror inclination at azimuths from 50° to 130° is equal to 45° [7] whereas at azimuth angles greater than 130° altitude is always greater than 0°, so in that area the minimum useful mirror inclination is greater than 45° and its position is indicated by the curved line [8]. The hatched area shows the useful area of mirror whilst the stippled area of the drawing [9] shows where a mirror surface, if provided, would be of no use, so this part may be omitted in manufacture or cut away upon installation. The quantities used in construction of the Figure are now tabulated. The Table shows azimuth at intervals of 10°, range in degrees of useful mirror inclinations along that azimuth, $H_{max}$ and where minimum useful inclination is more than 45°, also $H_{min}$.

| Azimuth° | Mirror° | $H_{max}$ | Azimuth° | Mirror° | $H_{max}$ | $H_{min}$ |
|---|---|---|---|---|---|---|
| 50 | 45 | 0.71 | 120 | 45-70 | 0.94 | |
| 60 | 45-48 | 0.75 | 130 | 45-72 | 0.95 | 0.71 |
| 70 | 45-52 | 0.79 | 140 | 48-73 | 0.96 | 0.74 |
| 80 | 45-56 | 0.83 | 150 | 50-74 | 0.96 | 0.76 |
| 90 | 45-60 | 0.87 | 160 | 51-75 | 0.97 | 0.78 |
| 100 | 45-64 | 0.90 | 170 | 52-76 | 0.97 | 0.79 |
| 110 | 45-67 | 0.92 | 180 | 52-76 | 0.97 | 0.79 |

FIG. 4B is the same mirror as 4A, though the scale is different, viewed from the East in a horizontal plane. The centre [4] is a point on the wall above the mirror and azimuth lines angle downwards to their point of intersection with the top edge of the mirror crowding especially at the South end and somewhat less at the North end because of the standpoint of the viewer. The upper edge of the mirror [6] crosses each azimuth at the vertical distance below the centre where the maximum usable mirror inclination is found at midsummer. The area of mirror that would be of no use because of too low inclination is not distinguished in this drawing. The Table shows azimuth at 10° intervals, range of mirror inclinations along that azimuth, and the vertical distance just described ($V_{max}$). At azimuth angles greater than 130° the altitude of the sun is always greater than 0°; $V_{min}$ (not shown in the drawing) is the vertical distance below datum corresponding to the corresponding minimum mirror inclinations.

| Azimuth° | Mirror° | $V_{max}$ | Azimuth° | Mirror° | $V_{max}$ | $V_{min}$ |
|---|---|---|---|---|---|---|
| 50 | 45 | 0.71 | 120 | 45-70 | 0.34 | |
| 60 | 45-48 | 0.66 | 130 | 45-72 | 0.31 | 0.71 |
| 70 | 45-52 | 0.62 | 140 | 48-73 | 0.29 | 0.68 |
| 80 | 45-56 | 0.55 | 150 | 50-74 | 0.26 | 0.65 |
| 90 | 45-60 | 0.50 | 160 | 51-75 | 0.26 | 0.63 |
| 100 | 45-64 | 0.44 | 170 | 52-76 | 0.25 | 0.62 |
| 110 | 45-67 | 0.39 | 180 | 52-76 | 0.25 | 0.61 |

FIG. 5 shows schematically the effect of the invention in a confined space. In FIG. 5, target area 50 is disposed between two walls 51, 52. At this location, even at its highest, light from the sun 53 does not directly illuminate the entirety of target area 50, a shaded region 60 being in shadow from wall 51. A convex reflecting surface 56 is mounted to wall 52 so that light 54 from the sun 53 is reflected 55 into shaded region 60. Also shown as dotted lines is the sun 53' at a lower position in the sky, light 54' being reflected 55' into larger shaded region 60'. The convex reflecting surface 56 thus provides reflected light in the shaded region 60 that does not receive direct sunlight, and provides reflected light to shaded region 60' effectively extending the time for which sunlight is received. Although indicated as being between walls, it is evident that the same principle applies in open ground and that regions shaded from direct solar radiation by plants 70 can be illuminated through reflected solar radiation from convex reflecting surface 56.

FIG. 6 shows the top edge only [10] of a mirror designed to be adjusted at the spring and autumnal equinox to serve optimally during the summer months (dashed lines) and winter months (solid lines) respectively by adjusting the lengths of at least two tripod arms [11 and 12] so that the mirror faces roughly azimuths of 60° to 120° and 120° to 180° respectively. Illustrated is a mirror at approximately 50° N latitude, secured to an East-facing wall as for FIGS. 4A and 4B. Here we assume that in the particular location of this mirror, reflection of light downwards is not required near noon at midsummer, but reflection of the earlier-morning light is advantageous. At midwinter, all the sunlight possible should be reflected downwards.

FIG. 7 shows the azimuthal section of a portion of mirror wherein the mirror surface does not conform to the segment of a circle but is more extended at lower mirror inclinations so that a larger area is useful when the altitude of the sun is close to horizontal. A circular section is shown for comparison and a tangent in common to the two curves at approximately 45° Two major modes of application are envisaged although the invention is not limited thereto. In the first, small units will be installed to deflect radiation down into shaded areas particularly of a domestic yard or garden. These can be mass-manufactured by casting in materials such as expanded polystyrene and made reflective either during the casting process or afterwards by surface treatment with a metal-containing foil or paint A frame made of a stronger material is incorporated to allow attachment of the mounting means. The shape of the unit will be determined partly by the latitude at which it will be used, partly by the range of azimuths available for insolation at the proposed location. By taking advantage of the adjustability provided for, a restricted range of shapes and sizes will suffice and unnecessary or undesirable portions of a standard unit can be cut away before installation which, together with choice of unit, is best done by specially trained and equipped personnel of the distributor, to ensure that angles are correct.

The second mode of application is custom designed units chiefly for commercial application, larger, often requiring stronger and heavier materials than for the small mass-produced units; in other instances extremely light in weight including balloons or other membrane-based designs, or multiple component mirrors, individually small and light resembling the mass-produced type and almost or completely flat, mounted on a separately manufactured frame. The individual component mirrors may individually be curved. Such large units will be individually designed taking account of the likely savings in fuel costs, planning requirements including the avoidance of fossil fuels where possible, exact days and times of use, etc., using mathematical or computer tools such as the APP referred to above. Moulds for casting that can be readily twisted to yield a variety of shapes on different occasions will prove useful. Mounting will often be on specially-built steel towers allowing occasional adjustment or demounting for cleaning, maintenance, repair and replacement, and such towers are likely to be the most costly part of any installation.

Alignment of the mirrors or other convex reflective surface may be assisted by provision of alignment features with defined angular relationship to the convex reflective surface or component reflective surfaces. For example, flats may be provided so that alignment can be done with a spirit level.

The invention contributes to economic activity on many levels, in design and consultancy, manufacture of units, distribution, installation by new-skilled personnel, improved productivity of horticulture and improved leisure activity, and at the same time will serve the cause of minimizing fossil fuel use by economizing on the use of electrical power in horticulture, whether commercial or hobby, and otherwise.

In summary, disclosed is a convex mirror or its equivalent in accordance with the claims, including a Fresnel mirror or an assembly of mirrors having the same effect as a convex mirror characterised by being of such construction, shape, curvature, dimensions and relative disposition of the constituent parts and capable of being so oriented and installed at a chosen location that without being moved or adjusted during a period of operation of up to one calendar year it deflects radiation emanating from the sun directly or obliquely downwards to fall upon a chosen target area at an intensity less than or equal to the intensity falling upon the mirror itself, either at all times when the sun is above the horizon and the mirror is not itself in shadow or at times selected therefrom to suit the particular objectives of the installation.

The said mirror may have a rough or interrupted reflective surface capable of diffusing the deflected radiation sufficiently to avoid a damaging concentration of radiation at any spot within the target area and may be provided with gaps in its reflective surfaces and in other respects also be shaped to minimise the aerodynamic effects of air currents. The said mirror may be adaptable during manufacture or at or after the time of installation by obscuring or removing segments of its reflective surfaces that are unnecessary or counterproductive for the purpose for which the installation is made. The said mirror may be so designed that it can be adjusted in orientation, fixed in position at the time of original installation, and later readjusted and re-fixed as necessary including sufficiently to accommodate changes in the direction and altitude of the sun that occur at different seasons of the year, and may be provided with supplementary radiation-deflecting means or screens that prevent deflected radiation from reaching areas that should not receive that radiation, either at any time or at chosen times.

The mirror and component mirrors may be of any mechanical construction, including of a lightweight expanded plastic material, cast, cut or moulded into the desired shape or shapes and coated on one or more faces with reflective material such as metal foil or a metal based paint but not limited thereto, incorporating or attached to a frame that allows fixing to a solid support, orienting appropriately, securing in the chosen settings, and later readjusting as necessary. The said mirror may alternatively consist of a membrane held in position and in the correct shape by being stretched over a frame or former or by gas pressure, including a tethered balloon, but likewise capable of orientation, fixation and adjustment as for other embodiments.

Devices other than mirrors or including one or more components that are not mirrors can deflect radiation wholly or in part by other means than reflection, but serve the function of being equivalent to a convex reflective surface, including diffusion of the deflected radiation, minimisation of aerodynamic effects, adaptability and adjustment after installation.

The invention claimed is:

1. A method for increasing availability of light for photosynthesis by plants, the method comprising:
    selecting, at a time of manufacture of a convex reflective surface, maximum and minimum inclinations and curvature determined by a compass direction and latitude and range of azimuths available for insolation at a location where the convex reflective surface is to be mounted, such that the convex reflective surface will, when mounted, deflect insolation to a target area without adjustment of a position, the inclinations, or the curvature of the convex reflective surface;
    statically mounting the convex reflective surface in a fixed orientation at the position above the target area, so that the convex reflective surface has the selected maximum and minimum inclinations and curvature determined by the compass direction and the latitude and range of azimuths available for insolation at the location where the convex reflective surface is to be mounted and that vary with the compass direction, and
    deflecting sunlight received at the convex reflective surface vertically or obliquely downwards onto the target area without adjustment of the position, the inclinations, or the curvature of the convex reflective surface throughout the day.

2. The method of claim 1, wherein selecting further comprises eliminating deflection of insolation to the target area at certain times of the day by selecting one or more of the maximum and minimum inclinations and the curvature of the convex reflective surface to eliminate deflection corresponding to the certain times.

3. The method of claim 1, further comprising eliminating deflection of insolation to the target area at certain times of the day by removing or obscuring at least one segment of the convex reflective surface corresponding to the certain times.

4. A method for increasing availability of light for photosynthesis by plants, using multiple reflective surfaces providing an optical equivalent to a convex reflective surface the method comprising:
    selecting, at a time of manufacture, maximum and minimum inclinations and curvature of the convex reflective surface determined by a compass direction and latitude and range of azimuths available for insolation at a location where the multiple reflective surfaces are to be mounted, such that the multiple reflective surfaces will, when mounted, deflect insolation to a target area without adjustment of a position, the inclinations, or the curvature of the multiple reflective surfaces;
    statically mounting the multiple reflective surfaces in a fixed orientation at the position above the target area; and
    deflecting sunlight received at the multiple reflective surfaces vertically or obliquely downwards onto the target area without adjustment of the position, the inclinations, or the curvature of the multiple reflective surfaces throughout the day.

5. The method of claim 4, wherein selecting further comprises eliminating insolation to the target area at certain times of the day by selecting one or more of the maximum and minimum inclinations and the curvature of the multiple convex reflective surfaces to eliminate deflection corresponding to the certain times.

6. The method of claim 4, further comprising eliminating deflection of insolation to the target area at certain times of the day by removing or obscuring at least one segment of the multiple convex reflective surfaces corresponding to the certain times.

7. A method for increasing availability of light for photosynthesis by plants using a Fresnel mirror providing an optical equivalent to a convex reflective surface, the method comprising:
   selecting maximum and minimum inclinations and curvature of the convex reflective surface, determined by a compass direction and latitude and range of azimuths available for insolation at a location where the Fresnel mirror is to be mounted, such that the Fresnel mirror will, when mounted, deflect insolation to a target area without adjustment of a position, the inclinations, or the curvature of the Fresnel mirror after mounting;
   manufacturing the Fresnel mirror to provide the optical equivalent to the convex reflective surface in fixed orientation at the position above the target area;
   statically mounting the Fresnel mirror in fixed orientation at the position above the target area; and
   deflecting sunlight received at the Fresnel mirror vertically or obliquely downwards onto the target area without adjustment of the position, the inclinations, or the curvature of the Fresnel mirror throughout the day.

8. The method of claim 7, wherein selecting further comprises eliminating deflection of insolation to the target area at certain times of the day by selecting one or more of the maximum and minimum inclinations and the curvature of the Fresnel mirror to eliminate deflection corresponding to the certain times.

9. The method of claim 7, further comprising eliminating deflection of insolation to the target area at certain times of the day by removing or obscuring at least one segment of the Fresnel mirror corresponding to the certain times.

10. A method for increasing availability of light for photosynthesis by plants, the method comprising:
    statically mounting a convex reflective surface in a fixed orientation at a position above a target area, so that the convex reflective surface has maximum and minimum inclinations and curvature determined by a compass direction and a latitude and range of azimuths available for insolation at a location where the convex reflective surface is mounted and that vary with the compass direction, and deflecting sunlight received at the convex reflective surface vertically or obliquely downwards onto the target area without adjustment of the position, the inclinations, or the curvature of the convex reflective surface throughout the day, the convex reflective surface being manufactured to have selected maximum and minimum inclinations and curvature determined by the compass direction and latitude and range of azimuths available for insolation at the location where the convex reflective surface is mounted such that the convex reflective surface will when mounted at the location deflect insolation to the target area without adjustment of the position, the inclinations, or the curvature of the convex reflective surface.

11. A method for increasing availability of light at for photosynthesis by plants, using multiple reflective surfaces providing an optical equivalent to a convex reflective surface the method comprising:
    statically mounting the multiple reflective surfaces in a fixed orientation at a position above a target area; and deflecting sunlight received at the multiple reflective surfaces vertically or obliquely downwards onto the target area without adjustment of the position, the inclinations, or the curvature of the multiple reflective surfaces throughout the day, the multiple reflective surfaces being manufactured to provide an optical equivalent to a convex reflective surface having selected maximum and minimum inclinations and curvature determined by the compass direction and latitude and range of azimuths available for insolation at the location where the multiple reflective surfaces are mounted such that the multiple reflective surfaces will when mounted at the location deflect insolation to the target area without adjustment of a position, the inclinations, or the curvature of the multiple reflective surfaces.

12. A method for increasing availability of light for photosynthesis by plants using a Fresnel mirror providing an optical equivalent to a convex reflective surface, the method comprising:
    statically mounting the Fresnel mirror in fixed orientation at a position above a target area; and deflecting sunlight received at the Fresnel mirror vertically or obliquely downwards onto the target area without adjustment of the position, the inclinations, or the curvature of the Fresnel mirror throughout the day the Fresnel mirror being manufactured to provide an optical equivalent to a convex reflective surface having selected maximum and minimum inclinations and curvature determined by the compass direction and latitude and range of azimuths available for insolation at the location where the Fresnel mirror is mounted, such that the Fresnel mirror will, when mounted, deflect insolation to the target area without adjustment of a position, the inclinations, or the curvature of the Fresnel mirror after mounting.

* * * * *